(12) United States Patent
Shaw et al.

(10) Patent No.: US 12,437,030 B2
(45) Date of Patent: Oct. 7, 2025

(54) FINE-GRAINED CLASSIFICATION OF RETAIL PRODUCTS

(71) Applicant: Tata Consultancy Services Limited, Mumbai (IN)

(72) Inventors: Avishek Kumar Shaw, Kolkata (IN); Shilpa Yadukumar Rao, Chennai (IN); Pranoy Hari, Chennai (IN); Dipti Prasad Mukherjee, Kolkata (IN); Bikash Santra, Kolkata (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 967 days.

(21) Appl. No.: 17/450,066

(22) Filed: Oct. 5, 2021

(65) Prior Publication Data

US 2022/0114403 A1   Apr. 14, 2022

(30) Foreign Application Priority Data

Oct. 13, 2020   (IN) .............................. 202021044605

(51) Int. Cl.
*G06F 18/2411* (2023.01)
*G06F 18/22* (2023.01)
(Continued)

(52) U.S. Cl.
CPC .......... *G06F 18/2411* (2023.01); *G06F 18/22* (2023.01); *G06F 18/23213* (2023.01); *G06N 3/045* (2023.01); *G06N 3/08* (2013.01)

(58) Field of Classification Search
CPC ................. G06F 18/2411; G06F 18/22; G06F 18/23213; G06N 3/045; G06N 3/08
(Continued)

(56) References Cited

U.S. PATENT DOCUMENTS

| 10,713,544 B2 | 7/2020 | Darnell et al. |
| 2010/0226566 A1* | 9/2010 | Luo ........................... G06T 7/11 382/164 |

(Continued)

FOREIGN PATENT DOCUMENTS

CN   107592839 B   3/2020

OTHER PUBLICATIONS

Wang, Wenyong et al., "A self-attention-based destruction and construction learning fine-grained image classification method for retail product recognition", Neural Computing and Applications, 2020, vol. 32, Issue: 18, pp. 14613-14622, Publisher: Springer, https://www.readcube.com/articles/10.1007%2Fs00521-020-05148-3.

(Continued)

*Primary Examiner* — Austin Hicks
(74) *Attorney, Agent, or Firm* — Finnegan, Henderson, Farabow, Garrett & Dunner, LLP

(57) ABSTRACT

The fine-grained variations in product images are usually due to slight variations in text, size, and color of the package. Both marginal variations in image content and illumination poses an important challenge in product classification. This disclosure relates to a system and method for fine-grained classification of similar-looking products utilizing object-level and part-level information. The system simultaneously captures an object-level and part-level information of the product. The object-level classification score of the product is estimated with the trained RC-Net, a deep supervised convolutional autoencoder. For annotation-free modelling of part-level information of the product the discriminative part-proposal of the product is identified around the BRISK key points. An ordered sequence of the discriminative part-proposals and the product image, encoded using stacked convolutional LSTM network, estimates the part-level classification score. Finally, the trained RC-Net and stacked conv-LSTM network jointly classifies the product image based on the final classification score.

11 Claims, 7 Drawing Sheets

(51) Int. Cl.
*G06F 18/23213* (2023.01)
*G06N 3/045* (2023.01)
*G06N 3/08* (2023.01)

(58) Field of Classification Search
USPC .......................................................... 706/15
See application file for complete search history.

(56) References Cited

U.S. PATENT DOCUMENTS

| | | | | |
|---|---|---|---|---|
| 2016/0140519 | A1* | 5/2016 | Trepca | G06N 7/01 |
| | | | | 705/26.44 |
| 2017/0372475 | A1* | 12/2017 | Gulsun | G06F 18/24133 |
| 2018/0240233 | A1* | 8/2018 | Kiraly | G06T 7/0012 |
| 2018/0365317 | A1* | 12/2018 | Chong | G06Q 50/18 |
| 2019/0163698 | A1* | 5/2019 | Kwon | G06F 16/51 |
| 2020/0104457 | A1* | 4/2020 | Chuang | G06F 30/392 |
| 2020/0273180 | A1* | 8/2020 | Kaufmann | G06T 7/55 |

OTHER PUBLICATIONS

Touvron, Hugo et al, "Grafit: Learning fine-grained image representations with coarse labels", Computer Vision and Pattern Recognition, Nov. 2020, Publisher: Arxiv, https://arxiv.org/pdf/2011.12982.pdf.

* cited by examiner

FINE-GRAINED CLASSIFICATION OF RETAIL PRODUCTS

CROSS-REFERENCE TO RELATED APPLICATIONS AND PRIORITY

This U.S. patent application claims priority under 35 U.S.C. § 119 to India Application No. 202021044605, filed on Oct. 13, 2020. The entire content of the abovementioned application is incorporated herein by reference.

TECHNICAL FIELD

The disclosure herein generally relates to a field of image processing, and more specifically, to a system and method for fine-grained classification of a product image from a plurality of similar-looking products by utilizing object-level and part-level information.

BACKGROUND

In a retail store, a customer effortlessly classifies the variants of the product displayed on the shelves. However, the integration of such skills in a smart machine vision system poses various challenges. In the current arrangement, a product classification system will help in improving the accuracy of smart machine vision systems used for continuous monitoring of the arrangement of products on the shelves, checking compliance of the planogram, enhancing the value-added service to the consumer and assisting visually impaired shoppers.

The classification of products present in a supermarket is an example where a single template image of a product is usually captured in a controlled studio-like environment. On the contrary, due to uncontrolled retail store environment, the quality, illumination, scale, pose, viewing angles, magnification levels, lighting conditions and resolution of the product image may differ from those of the marketing image of the product. The fine-grained variations in products are usually due to slight variations in text, size, and color of the package. Both marginal variations in image content and illumination poses an important challenge in product classification.

SUMMARY

Embodiments of the present disclosure provides technological improvements as solutions to one or more of the abovementioned technical problems recognized by the inventors in conventional systems. For example, in one embodiment, a method and system for fine-grained classification of a product image from a plurality of similar-looking products is discussed.

In one aspect, a system is configured for fine-grained classification of a product image from a plurality of similar-looking products. The system comprises at least one memory storing a plurality of instructions and one or more hardware processors communicatively coupled with the at least one memory, wherein the one or more hardware processors are configured to execute one or more modules.

The system herein configured to receive at least one template image of each of the plurality of similar-looking products and the product image from a user and pre-process the received at least one template image of each of the plurality of similar-looking products and the product image according to one or more predefined standards. The pre-processed at least one template image of each of the plurality of similar-looking products is augmented based on a predefined photometric and geometric transformations. A reconstruction-classification network (RC-Net) and a stacked convolutional Long Short-Term Memory (conv-LSTM) network are trained using the augmented at least one template image of each of the plurality of similar-looking products.

Further, the system is configured to capture an object-level information of the product image using the trained RC-Net to estimate an object-level classification score of the product image using the trained RC-Net based on the captured object-level information. One or more key points on the product image are identified using a predefined Binary Robust Invariant Scalable Keypoints (BRISK) model to generate one or more part-proposals of the product image. The generated one or more part-proposals of the product image are clustered into one or more clusters using a predefined K-means clustering model based on the predefined co-ordinate of the one or more key points and a feature vector from each of the one or more part-proposals of the product image is extracted using the trained RC-Net.

Furthermore, the system is configured to calculate a cosine similarity score between the extracted feature vector of one or more part-proposals in each of the one or more clusters using the trained RC-Net to create a symmetric matrix and to determine a discriminative part-proposal in each of the one or more clusters. The determined discriminative part-proposal in each of the one or more clusters are sequenced based on the predefined co-ordinate. Further, the system is configured to estimate a part-level classification score of the product image using the trained stacked conv-LSTM network. Further, the object-level and part-level classification score is combined to get a final classification score of the product image from the plurality of similar-looking products to classify a product image based on the final classification score.

In another aspect, a processor-implemented method for fine-grained classification of a product image from a plurality of similar-looking products is discussed. The processor-implemented method comprising one or more steps as follows. The method comprising receiving at least one template image of each of the plurality of similar-looking products and the product image from a user and pre-process the received at least one template image of each of the plurality of similar-looking products and the product image according to one or more predefined standards. The pre-processed at least one template image of each of the plurality of similar-looking products is augmented based on a predefined photometric and geometric transformations. A reconstruction-classification network (RC-Net) and a stacked conv-LSTM network are trained using the augmented at least one template image of each of the plurality of similar-looking products.

Further, the processor-implemented method comprising capturing an object-level information of the product image using the trained RC-Net to estimate an object-level classification score of the product image using the trained RC-Net based on the captured object-level information. One or more key points on the product image are identified using a predefined Binary Robust Invariant Scalable Keypoints (BRISK) model to generate one or more part-proposals of the product image. The generated one or more part-proposals of the product image are clustered into one or more clusters using a predefined K-means clustering model based on the predefined co-ordinate of the one or more key points and a feature vector from each of the one or more part-proposals of the product image is extracted using the trained RC-Net.

Furthermore, the processor-implemented method comprising calculating a cosine similarity score between the extracted feature vector of one or more part-proposals in each of the one or more clusters using the trained RC-Net to create a symmetric matrix and to determine a discriminative part-proposal from the one or more part-proposals in each of the one or more clusters. The determined discriminative part-proposal in each of the one or more clusters are sequenced based on the predefined co-ordinate. Further, the processor-implemented method comprising estimating a part-level classification score of the product image using the trained stacked conv-LSTM network. Further, the object-level and part-level classification score is combined to get a final classification score of the product image from the plurality of similar-looking products to classify a product image based on the final classification score.

In yet another aspect, a non-transitory computer readable medium storing one or more instructions which when executed by one or more processors on a system cause the one or more processors to perform the method is provided. The non-transitory computer readable medium for fine-grained classification of a product image from a plurality of similar-looking products is provided. The method comprising one or more steps as follows. The method comprising receiving at least one template image of each of the plurality of similar-looking products and the product image from a user and pre-process the received at least one template image of each of the plurality of similar-looking products and the product image according to one or more predefined standards. The pre-processed at least one template image of each of the plurality of similar-looking products is augmented based on a predefined photometric and geometric transformations. A reconstruction-classification network (RC-Net) and a stacked conv-LSTM network are trained using the augmented at least one template image of each of the plurality of similar-looking products.

Further, the processor-implemented method comprising capturing an object-level information of the product image using the trained RC-Net to estimate an object-level classification score of the product image using the trained RC-Net based on the captured object-level information. One or more key points on the product image are identified using a predefined Binary Robust Invariant Scalable Keypoints (BRISK) model to generate one or more part-proposals of the product image. The generated one or more part-proposals of the product image are clustered into one or more clusters using a predefined K-means clustering model based on the predefined co-ordinate of the one or more key points and a feature vector from each of the one or more part-proposals of the product image is extracted using the trained RC-Net.

Furthermore, the processor-implemented method comprising calculating a cosine similarity score between the extracted feature vector of one or more part-proposals in each of the one or more clusters using the trained RC-Net to create a symmetric matrix and to determine a discriminative part-proposal from the one or more part-proposals in each of the one or more clusters. The determined discriminative part-proposal in each of the one or more clusters are sequenced based on the predefined co-ordinate. Further, the processor-implemented method comprising estimating a part-level classification score of the product image using the trained stacked conv-LSTM network. Further, the object-level and part-level classification score is combined to get a final classification score of the product image from the plurality of similar-looking products to classify a product image based on the final classification score.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION OF EMBODIMENTS

Figure 1:
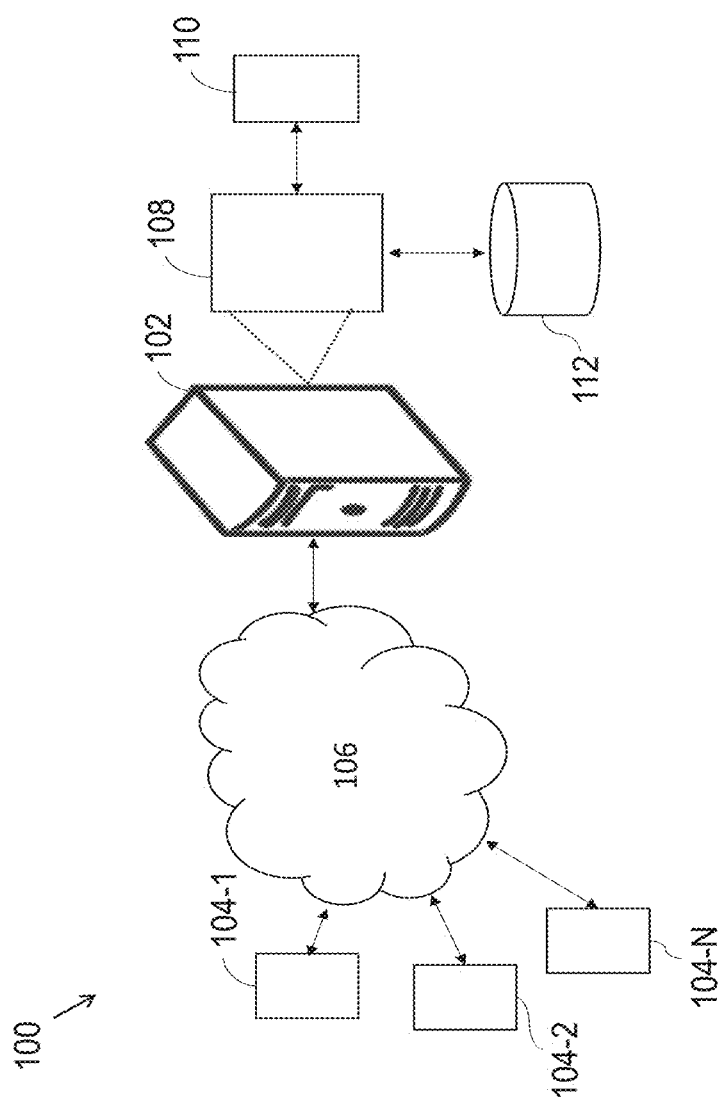
FIG. 1 illustrates a system for fine-grained classification of a product image from a plurality of similar-looking products, in accordance with some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments.

The embodiments herein provide a system and method for fine-grained classification of a product image from a plurality of similar-looking products. It is to be noted that herein the fine-grained products are those which differ from the other due to slight variations in text, size, and color. Further, herein the train data are the template images of the products which are ideally captured in a controlled studio environment. On the other hand, test data are the images of products extracted from the images of racks imaged in a dynamic store level illumination. These change in illumination make test data different from train data.

It would be appreciated that the RC-Net and stacked cony-LSTM network are the two streams of the proposed disclosure. The proposed approach differentiates fine-grained products in the same way as humans do. Generally, humans first see the overall product and then look for its important components which can discriminate the product from its variants. In the first stream of the proposed scheme, a reconstruction-classification network (RC-Net), a deep supervised convolutional autoencoder (SCAE) is used to perform the reconstruction and classification of products simultaneously. The RC-Net consists of three modules: encoder, decoder, and classifier. The encoder-decoder architecture of the RC-Net is for reconstruction of the product. The encoder-decoder architecture of RC-Net also captures the fine-grained features during the reconstruction process of the products and ignores the noise. The classifier of RC-Net is a fully connected network, which accepts the output of the encoder for classification. Moreover, the reconstruction-classification architecture of the proposed network provides the generalization.

Herein, the system is configured to simultaneously capture an object-level and part-level information of the products. The object-level information of the products is captured with the trained RC-Net, a deep supervised convolutional autoencoder. For annotation-free modelling of part-level information of the product image, the discriminative part-proposal of the product image is identified around the BRISK key points. An ordered sequence of the discriminative part-proposals, encoded using the trained stacked conv-LSTM network, describes the fine-grained products uniquely. Finally, the trained RC-Net and trained stacked conv-LSTM network jointly classify the product image based on the final classification score. The system first extracts object level features of the products followed by detection of fine-grained representations (or local key features) of the products.

Referring now to the drawings, and more particularly to FIG. 1 through FIGS. 6($a$) & ($b$) (collectively referred as FIG. 6), where similar reference characters denote corresponding features consistently throughout the figures, there are shown preferred embodiments and these embodiments are described in the context of the following exemplary system and/or method.

FIG. 1 illustrates a block diagram of a system (100) for fine-grained classification of a product image from a plurality of similar-looking products, in accordance with an example embodiment. Although the present disclosure is explained considering that the system (100) is implemented on a server, it may be understood that the system (100) may comprises one or more computing devices (102), such as a laptop computer, a desktop computer, a notebook, a workstation, a cloud-based computing environment and the like. It will be understood that the system 100 may be accessed through one or more input/output interfaces 104-1, 104-2 . . . 104-N, collectively referred to as I/O interface (104). Examples of the I/O interface (104) may include, but are not limited to, a user interface, a portable computer, a personal digital assistant, a handheld device, a smartphone, a tablet computer, a workstation, and the like. The I/O interface (104) are communicatively coupled to the system (100) through a network (106).

In an embodiment, the network (106) may be a wireless or a wired network, or a combination thereof. In an example, the network (106) can be implemented as a computer network, as one of the different types of networks, such as virtual private network (VPN), intranet, local area network (LAN), wide area network (WAN), the internet, and such. The network (106) may either be a dedicated network or a shared network, which represents an association of the different types of networks that use a variety of protocols, for example, Hypertext Transfer Protocol (HTTP), Transmission Control Protocol/Internet Protocol (TCP/IP), and Wireless Application Protocol (WAP), to communicate with each other. Further, the network (106) may include a variety of network devices, including routers, bridges, servers, computing devices, storage devices. The network devices within the network (106) may interact with the system (100) through communication links.

The system (100) supports various connectivity options such as BLUETOOTH®, USB, ZigBee and other cellular services. The network environment enables connection of various components of the system (100) using any communication link including Internet, WAN, MAN, and so on. In an exemplary embodiment, the system (100) is implemented to operate as a stand-alone device. In another embodiment, the system (100) may be implemented to work as a loosely coupled device to a smart computing environment. The components and functionalities of the system (100) are described further in detail.

The system (100) may be implemented in a workstation, a mainframe computer, a server, and a network server. In an embodiment, the computing device (102) further comprises one or more hardware processors (108), one or more memory (110), hereinafter referred as a memory (110) and a data repository (112), for example, a repository (112). The memory (110) is in communication with the one or more hardware processors (108), wherein the one or more hardware processors (108) are configured to execute programmed instructions stored in the memory (110), to perform various functions as explained in the later part of the disclosure. The repository (112) may store data processed, received, and generated by the system (100).

Figure 2:
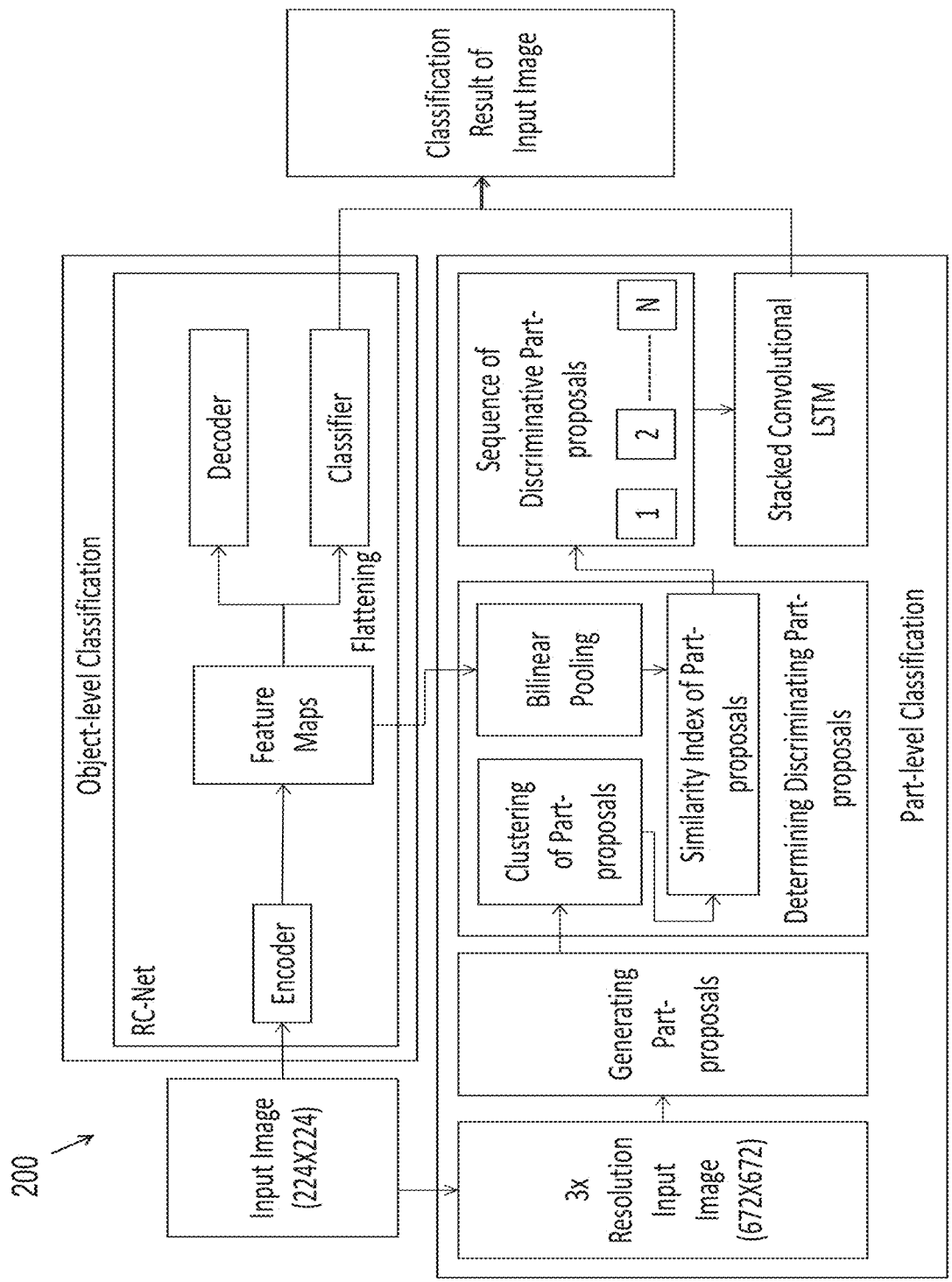
FIG. 2 is a functional block diagram to illustrate a RC-Net and stacked conv-LSTM network for fine-grained classification of products, in accordance with some embodiments of the present disclosure.

Referring FIG. 2, a functional block diagram (200) to illustrate RC-Net and stacked conv-LSTM network for fine-grained classification of products, wherein the system (100) is configured for fine-grained classification of a product image from a plurality of similar-looking products by utilizing object-level and part-level information. It is to be noted that herein the fine-grained products are those which differ from the other due to slight variations in text, size, and color. Further, herein the training data are the plurality of template images of the products which are ideally captured in a controlled studio environment. On the other hand, test data are the images of product extracted from the images of racks imaged in a dynamic store level illumination. These change in illumination make the test data different from the training data.

The I/O interface (104) of the system (100) is configured to receive at least one template image of each of the plurality of similar-looking products and the product image from a user. Further, the system (100) is configured to pre-process the received at least one template image of each of the plurality of similar-looking products and the product image according to one or more predefined standards.

It would be appreciated that the pre-processed at least one template image of each of the plurality of similar-looking products and the product image are transformed into a fixed size 224×224 dimension without altering the aspect ratio. Let, the height and width of an image (i.e. template image and product image) are h and w, respectively. If w is greater than h then the image is resized to 224×(224*h)/w else (224*w)/h×224. The resized image is then superimposed in a white 224×224 frame such a way that the center of the resized image must coincide with the center of the white frame. The image is then normalized by dividing all pixel values of the image by the largest pixel value i.e. 255. For a stacked conv-LSTM network, the pre-processed image is resized to the dimension of 672×672.

Furthermore, the system is configured to augment the pre-processed at least one template image of each of the plurality of similar-looking products based on a predefined photometric and geometric transformations. Herein, the photometric transformations include blurring (Gaussian, mean and median), noise (salt & pepper and Gaussian) addition, random brightness adjustment, and random contrast adjustment are applied on the image. The geometric transformations comprising of distortion, shearing, translation, and rotation are applied on the images after photometric transformations.

Again referring FIG. 2, wherein the system is configured to train a reconstruction-classification network (RC-Net) and a stacked convolutional Long Short-Term Memory (conv-LSTM) network using the augmented at least one template image of each of the plurality of similar-looking products. The trained RC-Net is used to capture an object-level information of the product image. The object-level information represents the underlying pattern of the product image.

Figure 3:
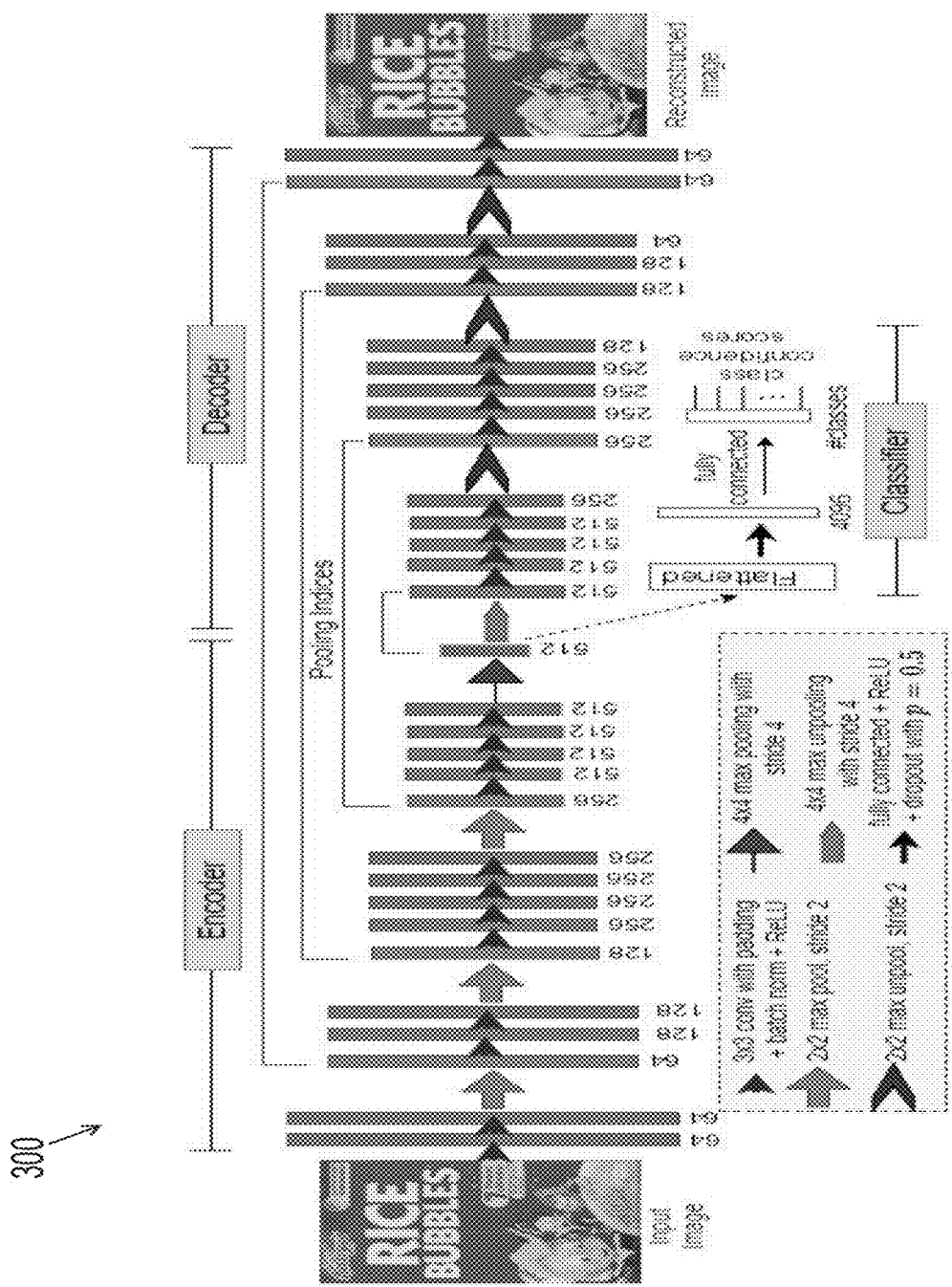
FIG. 3 is a schematic architecture of the RC-Net, in accordance with some embodiments of the present disclosure.

It is to be noted that the trained RC-Net is capable to capture the difference between the training data (template image) and test data (product image). The trained RC-Net is robust to classification task due to enhanced generalizability of the network as shown in FIG. 3. The FIG. 3, a schematic diagram (300), illustrates a schematic architecture of the RC-Net. Herein, an encoder-decoder architecture of the trained RC-Net significantly improves the classification performance. The layers in encoder-decoder module of the trained RC-Net are convolutional which improves the reconstruction capability of the RC-Net by preserving the local relationship between the neighboring pixels in the template image.

It would be appreciated that the RC-Net and the stacked cony-LSTM network are the two streams of the proposed disclosure. The proposed approach differentiates fine-grained products in the same way as humans do. Generally, humans first see the overall product and then look for its important components which can discriminate the product from its variants. In the first stream of the proposed disclosure, a reconstruction-classification network (RC-Net), a deep supervised convolutional autoencoder (SCAE) is used to perform the reconstruction and classification of products simultaneously. The RC-Net consists of three modules: encoder, decoder, and classifier. The encoder-decoder architecture of RC-Net is for reconstruction of the product. The encoder-decoder architecture of RC-Net also captures the fine-grained features during the reconstruction process of the products and ignores the noise. The classifier of RC-Net is a fully connected network, which accepts the output of the encoder for classification. Moreover, the reconstruction-classification architecture of the proposed network provides the generalization.

Figure 4:
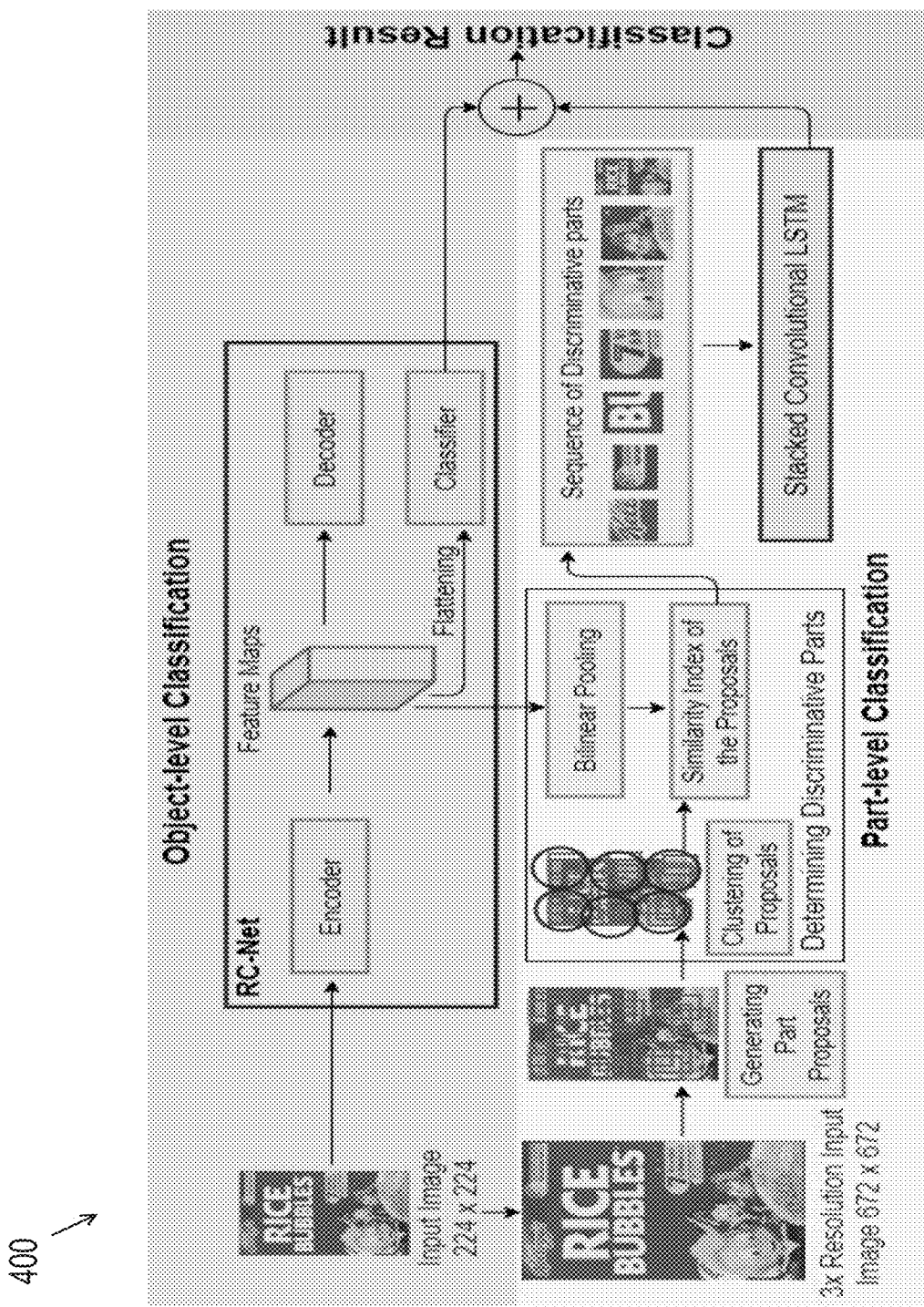
FIG. 4 is a schematic diagram to illustrate an example of a RC-Net and stacked conv-LSTM network for fine-grained classification of products, in accordance with some embodiments of the present disclosure.

Referring FIG. 4, a schematic diagram (400), to illustrate an example of a RC-Net and stacked conv-LSTM network for fine-grained classification of products. It is to be noted that the performance of RC-Net does not get affected even if the test data is different from the training data due to the change in illumination. In the RC-Net, reconstruction loss eventually regularizes the classification loss, which makes the RC-Net robust to fine-grained classification task in varying illuminations. The ability of simultaneous reconstruction and classification of products is core idea of RC-Net. The RC-Net is a combination of convolutional autoencoder and CNN classifier. The convolutional autoencoder tries to optimize the reconstruction loss while the classifier wants to optimize the classification loss. In RC-Net, the addition of classification loss (or supervised loss) to the reconstruction loss (or unsupervised loss) makes the convolutional autoencoder capable of representing the underlying pattern of the product. Conversely, the addition of reconstruction loss to the classification loss forces the classifier to learn product discriminative information along with the underlying pattern of the product. This way, the reconstruction and classification joint loss enforces RC-Net to balance both extraction of underlying structure and inference of correct prediction of the product. In other words, reconstruction loss regularizes the classification loss for the classification task.

In the preferred embodiment of the disclosure, wherein the object-level classification of the products is performed using the trained RC-Net. The trained RC-Net is essentially an extension of deep supervised autoencoder (SAE) to the deep supervised convolutional autoencoder (SCAE). It would be appreciated that the trained RC-Net reconstructs and predicts the products simultaneously for classification of fine-grained products in varying illumination conditions. The RC-Net consists of three modules: encoder, decoder and classifier as shown in FIG. 2. The encoder-decoder architecture of the RC-Net is for reconstruction of the products. Whereas the classifier is a fully connected network, which accepts the output of the encoder, for performing the classification task.

Referring FIG. 4, a schematic diagram (600) to illustrate an example of RC-Net and stacked conv-LSTM network for fine-grained classification of products. Herein, the network has three different sections: encoder, decoder and classifier which are individually marked in the FIG. 4. The encoder and decoder consist of twelve and eleven 3×3 padded convolution layers, respectively. There exists a batch normalization layer after each convolution layer followed by a rectified linear unit (ReLU) layer. Encoder includes four 2×2 max pooling (with stride 2) layers and one 4×4 max pooling (with stride 4) layer. In the decoder, the max unpooling layers are placed in the corresponding positions to the max pooling layer in the encoder.

It would be appreciated that the classifier of the RC-Net consists of two fully connected layers (fc-layer) out of which one is hidden layer, and another is output layer with the nodes equivalent to the number of classes. However, after the hidden layer, the RC-Net includes batch normalization followed by ReLU and deterministic dropout layers successively. Initialization of the weights is utmost essential for any deep neural network with multiple numbers of layers, operations, and paths. The weights of all convolution layers of encoder are initialized with the weights of first twelve convolution layers of the pre-trained pytorch implementation of a Visual Geometry Group-19 (VGG-19) network. In case of decoder, the initial weights of seven convolution layers, which exactly adhere with the layers of the VGG-19 network, are set to the pre-trained weights of VGG-19. The initial weights of the remaining layers of decoder are picked up from the Gaussian distribution.

In another embodiment, the system is configured to capture an object-level information of the product image using the trained RC-Net to estimate an object-level classification score of the product image. The object-level information represents the underlying pattern of the product image.

The second stream of the proposed solution essentially boosts up the classification performances of the first stream. The system (100) is configured to generate the part proposals followed by the selection of discriminative part-proposals and classification of the sequence of those part-proposals using the trained stacked conv-LSTM network. Herein, firstly the discriminative part-proposals of the product are identified and then organized in an ordered sequence to uniquely describe the products. Further, the sequence of discriminative part-proposals is classified for determining the products using the trained stacked conv-LSTM network. Finally, classification scores obtained from both the streams jointly classifies the product image.

Again referring FIG. 3, wherein the second stream identifies the discriminative part-proposals of the product and the ordered sequence of those part-proposals are fed to the stacked conv-LSTM network for obtaining the part-level classification scores of the product. The system first generates the part-proposals followed by the selection of discriminative part-proposals and classification of the sequence of those part-proposals using the stacked conv-LSTM network. It is to be noted that an unsupervised keypoint based approach is used for generation of part-proposals. The keypoints are the most important locations in the product which requires serious attention to derive the important components of the product. In a local neighborhood of the keypoint, the change in intensity is much higher than other regions which do not include keypoints.

For any given product image, the system (100) is configured to identify one or more key points on the product image using a predefined Binary Robust Invariant Scalable Keypoints (BRISK) model. Each of the one or more identified key points is represented by a predefined co-ordinate. One or more part-proposals of the product image are generated based on the identified one or more key points. The generated one or more part-proposals of the product image are clustered into one or more clusters using a predefined K-means clustering model based on the predefined co-ordinate of the one or more key points.

Further, the system is configured to determine the discriminative part-proposal from the one or more part-proposals. It would be appreciated that the extracted part-proposals are the probable discriminative part-proposal of the product image. There exists many (spatially close) overlapping or non-overlapping part-proposals which represent a specific part of the product. Herein, a group of proposals point to a specific part of the product. The proposals within a group are essentially the representatives of a discriminative parts. Therefore, the groups of overlapping proposals are identified followed by the selection of only one proposal (from a group) which has the most potential in representing the part.

Further, the system first represents uniquely the extracted part-proposals with the most discriminative features and then extracts the discriminative features from the extracted part-proposals followed by determining discriminative part-proposals of the products. The layers at the end of a CNN contain more discriminative information (which is utmost important for fine-grained classification of product) about the objects compared to the layers at the beginning. Therefore, the system extracts feature for each of the extracted part-proposal from the last convolution layer of encoder of the trained RC-Net. The features are derived by resizing the extracted part-proposal into the size of receptive field of the last convolution layer and the resized part-proposal is forward propagated through the convolution layers of encoder in the trained RC-Net.

In the process of determining the discriminative part-proposal, the system first spatially clusters the extracted part-proposals into one or more clusters. The spatial clustering of part-proposals essentially refers to the clustering of co-ordinates (or locations) of the keypoints on the product image. Herein, K-means clustering model is used to obtain the one or more clusters of one or more part-proposals. In each cluster, a proposal, which is visually similar with maximum number of proposals in the cluster, is selected as the potential representative of a part. The visual similarity between the proposals is measured by calculating the cosine similarity score between the extracted feature vector of one or more part-proposals in each of the one or more clusters using the trained RC-Net. Further, the system creates a symmetric matrix using the calculated cosine similarity score for each of the one or more clusters to determine a discriminative part in each of the one or more clusters.

Thereafter, one part-proposal is selected from each group for representing the discriminative part-proposal. The system then forms a sequence of the determined discriminative part-proposal based on the predefined co-ordinates. But the dimension of the receptive field of the last layer of encoder in trained RC-Net is much larger.

In one example, wherein the dimension of the receptive field of the last convolution layer is 160×160 compared to a 224×224 input product image, which is too large to extract the features of a product's part. This creates a practical problem. Resizing of a small part-proposal into the size of receptive field destroys the spatial relationship between the neighboring pixels (local features) which essentially indicates the product's part-level information. Therefore, the product images are untemplated during part-proposal extraction such a way that the dimension of the part-proposals almost matches with that of the fixed-size receptive field.

It would be appreciated that the stacked conv-LSTM network is trained for encoding the part-level features and boosting the overall performances of fine-grained classification of the products. Herein the stacked conv-LSTM network essentially works as a classifier. A major benefit of using conv-LSTM over LSTM is that image can be directly fed to conv-LSTM without determining the features previously. In the sequence of discriminative part-proposals of the products, the template image is also included as the last member of the sequence to relate the parts with the template image. The updated sequence is an input to the proposed stacked conv-LSTM network. The stacked conv-LSTM network is trained using the sequenced discriminative part-proposals and the template image.

In one example, wherein four-layered stacked conv-LSTM network for encoding the part-level information is provided. In the hidden states, applying 64, 128, 256, and 512 convolution filters in the conv-LSTM layers (or units), from first to last, respectively. Notably, 3×3 padded convolution operation is applied herein. The hidden state of the first cony-LSTM is the output of it. The output is then forwarded through a batch normalization and a max pooling layer. The resultant output is then set as input to the next conv-LSTM layer. Similar process is iterated for rest of the layers. Note that, 2×2 max pooling (with stride 2) is applied on first three layers while 4×4 max pooling (with stride 4) is performed on the last layer. The length of the sequence P is the number of time steps to unroll the cony-LSTM units. The output of our conv-LSTM network at the last time step defines a feature vector z which is further connected to a fc-layer with 4096 neurons (referred as hidden fc-layer). Again these 4096 neurons are linked to another fc-layer with neurons equivalent to the number of products or classes (referred as output layer).

Figure 5:
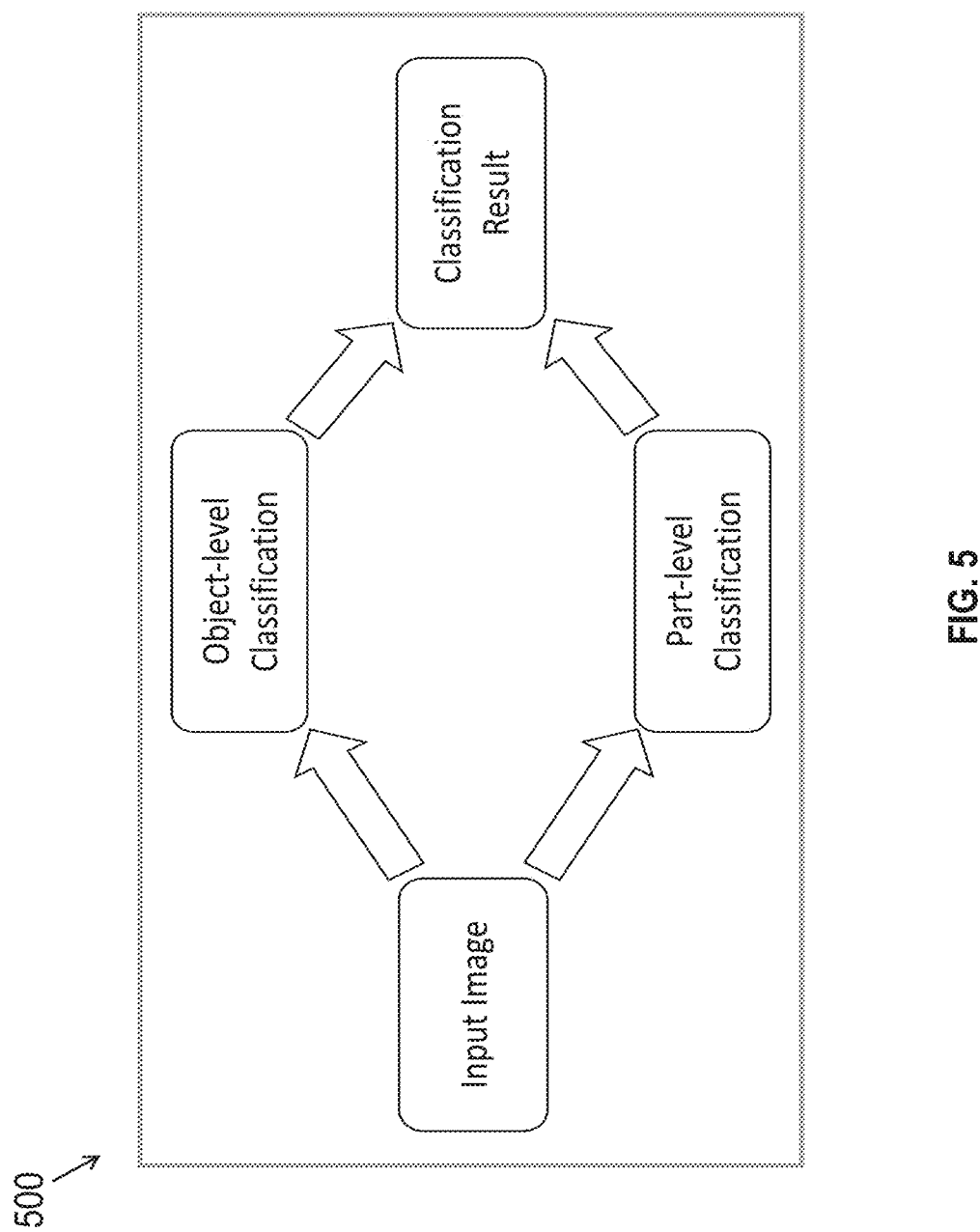
FIG. 5 is a block diagram to illustrate classification of fine-grained products, in accordance with some embodiments of the present disclosure.

Referring FIG. 5, a block diagram (500), illustrating classification of fine-grained products, in accordance with some present embodiment. The feature reconstruction mechanism of the trained RC-Net improves the classification performance. Similarly, encoding of part-level features using the stacked conv-LSTM also helps in classifying fine-grained products. The classification potentiality of the trained RC-Net is much higher than the trained stacked conv-LSTM network. But it is observed that the trained stacked conv-LSTM network significantly boosts up the classification performances of trained RC-Net. Therefore, the system combines them together for accurate classification of fine-grained products. The system is configured to combine the object-level and part-level classification score to get a final classification score of the product image from the plurality of similar-looking products to classify a product based on the final classification score.

The training of RC-Net and stacked conv-LSTM network are performed separately. Once the training is complete, the product image (having label vector l) is parallelly fed to the trained RC-Net and stacked conv-LSTM network to obtain the predicted vectors l' and $\hat{l}$ containing the class confidence scores. The final classification scores $l_F$ for the product image is obtained as $$l_F = l' + \gamma \hat{l} \quad (1)$$

wherein $\gamma \in [0,1]$ is the boost factor to improve the object-level classification score for recognition of fine-grained products. The predicted class confidence scores in $l_F$ carry both object-level and part-level information of the fine-grained products. Further, the class probabilities for the product image l is obtained by applying a soft-max function as:

$$l'_{Fi} = \frac{e^{l_{Fi}}}{\sum_{\alpha=1}^{c} e^{l_{F\alpha}}}, \forall l_{Fi} \in l_F, i = 1, 2, \ldots, c \quad (2)$$

The class with highest probability is the predicted label for the product image I.

Figure 6A:
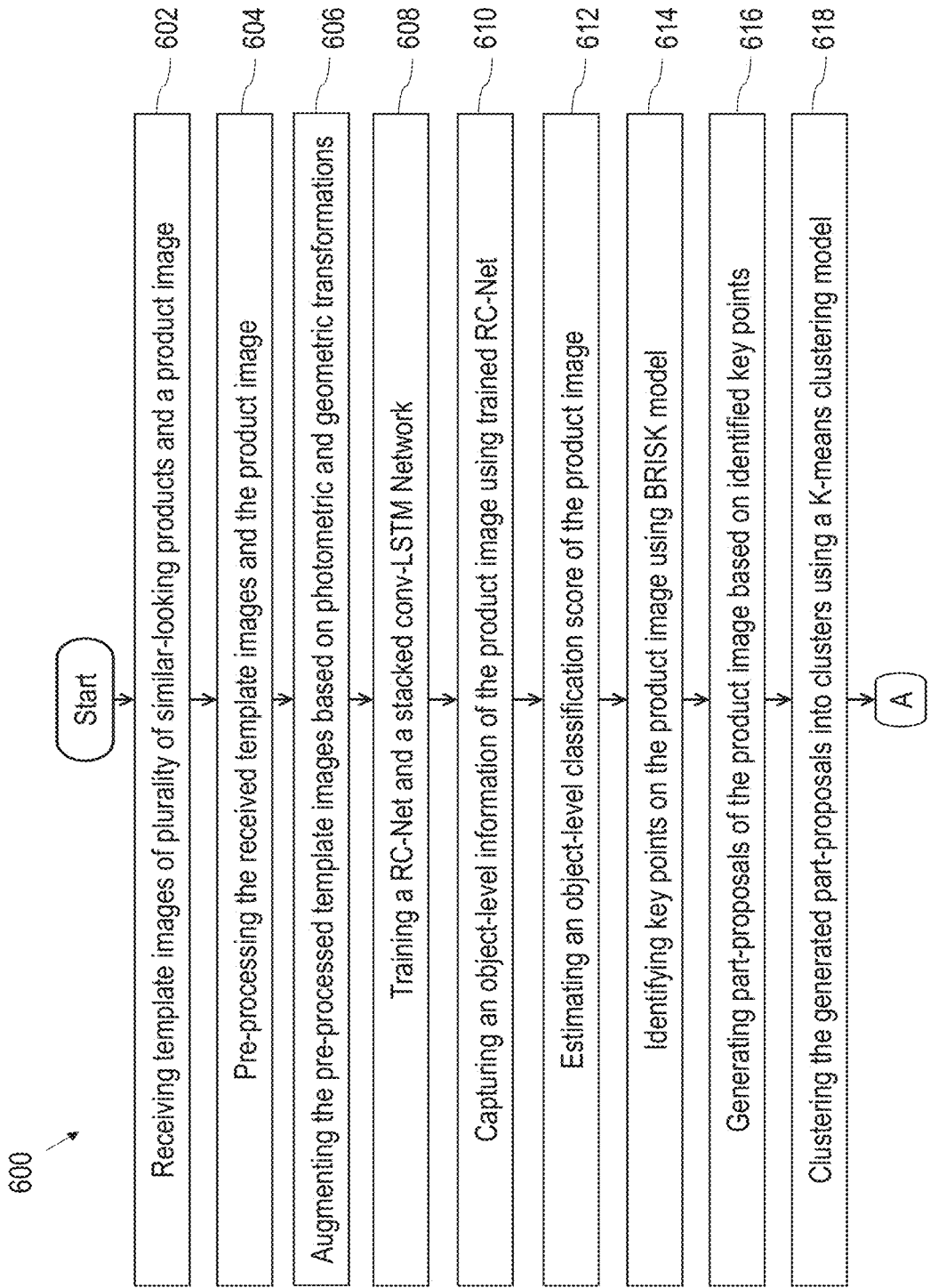
FIGS. 6(a) & (b) is a flow diagram to illustrate a method for fine-grained classification of a product image from a plurality of similar-looking products, in accordance with some embodiments of the present disclosure.
Figure 6B:
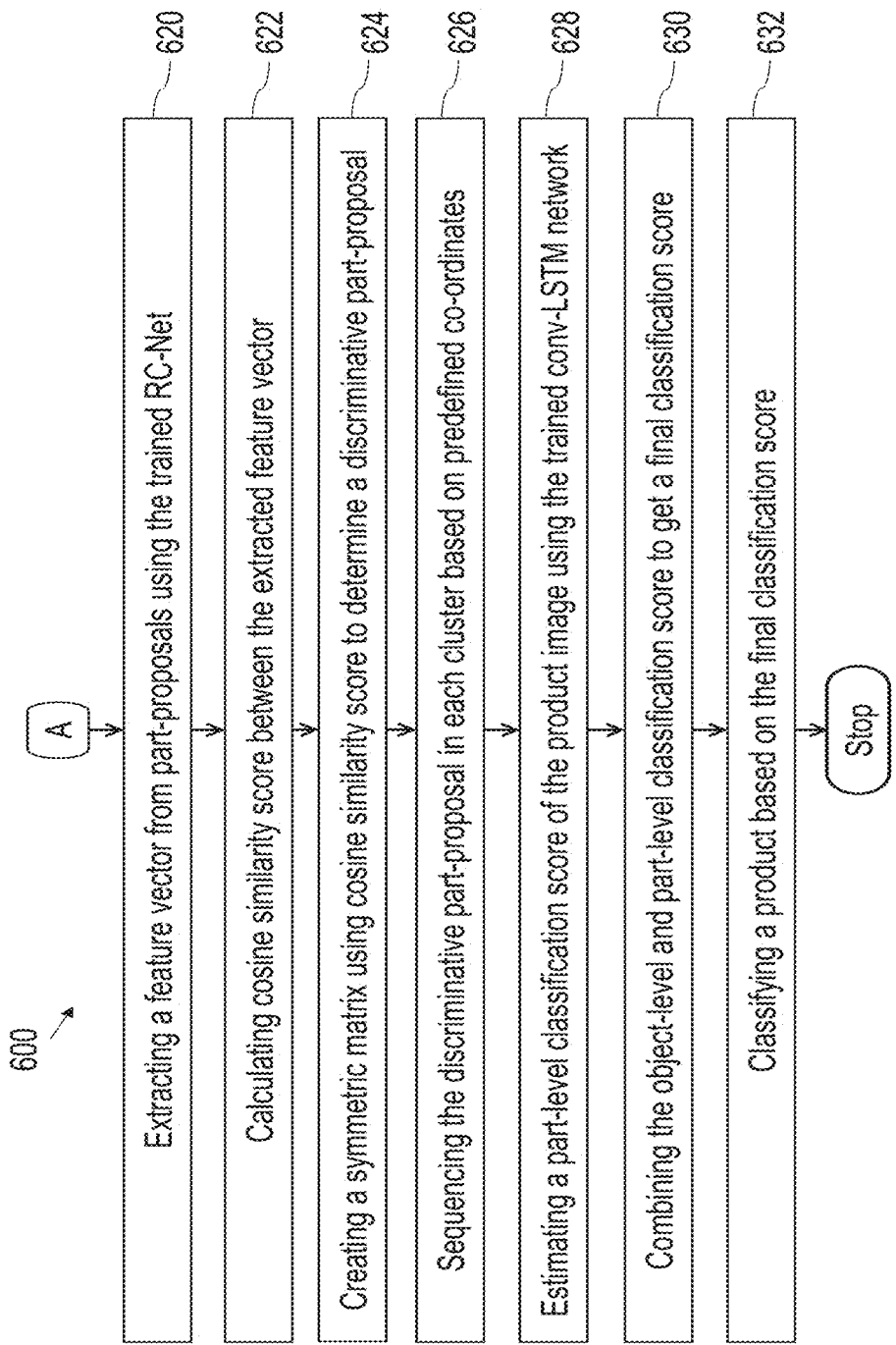

FIG. 6(a) & (b) illustrates a processor-implemented method (600) for fine-grained classification of a product image from a plurality of similar-looking products by utilizing object-level and part-level information. The method comprises one or more steps as follows.

At the step (602), receiving, via an input/output interface, at least one template image of each of the plurality of similar-looking products and the product image from a user.

At the step (604), pre-processing, via a one or more hardware processors, the received at least one template image of each of the plurality of similar-looking products and the product image according to one or more predefined standards.

At the step (606), augmenting, via the one or more hardware processors, the pre-processed at least one template image of each of the plurality of similar-looking products based on a predefined photometric and geometric transformations.

At the step (608), training, via the one or more hardware processors, a reconstruction-classification network (RC-Net) and a stacked conv-LSTM network using the augmented at least one template image of each of the plurality of similar-looking products.

At the step (610), capturing, via the one or more hardware processors, an object-level information of the product image using the trained RC-Net. Herein, the object-level information represents underlying pattern of the product image.

At the step (612), estimating, via the one or more hardware processors, an object-level classification score of the product image using the trained RC-Net based on the captured object-level information.

At the step (614), identifying, via the one or more hardware processors, one or more key points on the product image using a predefined Binary Robust Invariant Scalable Keypoints (BRISK) model. Herein, each of the one or more identified key points is represented by a predefined co-ordinate.

At the step (616), generating, via the one or more hardware processors, one or more part-proposals of the product image based on the identified one or more key points.

At the step (618), clustering, via the one or more hardware processors, the generated one or more part-proposals into one or more clusters using a predefined K-means clustering model based on the predefined co-ordinates of the one or more key points.

At the step (620), extracting, via the one or more hardware processors, a feature vector for each of the one or more part-proposals using the trained RC-Net.

At the step (622), calculating, via the one or more hardware processors, a cosine similarity score between the extracted feature vector of one or more part-proposals in each of the one or more clusters using the trained RC-Net.

At the step (624), creating, via the one or more hardware processors, a symmetric matrix using the calculated cosine similarity score for each of the one or more clusters to determine a discriminative part-proposal in each of the one or more clusters.

At the step (626), sequencing, via the one or more hardware processors, the determined discriminative part-proposal in each of the one or more clusters based on the predefined co-ordinates.

At the step (628), estimating, via the one or more hardware processors, a part-level classification score of the product image using the trained stacked conv-LSTM network based on the part-level information.

At the step (630), combining, via the one or more hardware processors, the object-level and part-level classification score to get a final classification score of the product image from the plurality of similar-looking products.

At the last step (632), classifying, via the one or more hardware processors, a product based on the final classification score.

The embodiments of present disclosure herein address unresolved problem associated with detection of products in a supermarket. Embodiments herein provide a system and method for fine-grained classification of a product image from a plurality of similar-looking products by utilizing object-level and part-level information. The system simultaneously captures an object-level and part-level information of the products. The object-level information of the products is captured with the trained RC-Net, a deep supervised convolutional autoencoder. For annotation-free modelling of part-level information of the product the discriminative part of the product image is identified around the BRISK key points. An ordered sequence of the discriminative parts, encoded using convolutional LSTM, describes the fine-grained products uniquely. Finally, the RC-Net and stacked conv-LSTM network jointly determine the products based on the final classification score. The system first extracts the coarse representations (or object level features) of the products followed by detection of fine-grained representations (or local key features) of the products.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device, which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means, and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purpose of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

What is claimed is:

1. A processor-implemented method for fine-grained classification of a product image from images of a plurality of similar-looking products comprising steps of:

receiving, via an input/output interface, at least one template image of each of the plurality of similar-looking products and the product image from a user;

pre-processing, via a one or more hardware processors, the received at least one template image of each of the plurality of similar-looking products and the product image according to one or more predefined standards;

augmenting, via the one or more hardware processors, the pre-processed at least one template image of each of the plurality of similar-looking products based on a predefined photometric transformation and a geometric transformation;

training, via the one or more hardware processors, a reconstruction-classification network (RC-Net) and a stacked convolutional Long Short-Term Memory (conv-LSTM) network using the augmented at least one template image of each of the plurality of similar-looking products;

capturing, via the one or more hardware processors, an object-level information of the product image using the trained RC-Net, wherein the object-level information represents an underlying pattern of the product image;

estimating, via the one or more hardware processors, an object-level classification score of the product image using the trained RC-Net based on the captured object-level information;

identifying, via the one or more hardware processors, one or more key points on the product image using a predefined Binary Robust Invariant Scalable Keypoints (BRISK) model, wherein each of the one or more identified key points is represented by a predefined co-ordinate;

generating, via the one or more hardware processors, one or more part-proposals of the product image based on the identified one or more key points, wherein a feature for each of the part-proposal from a last convolution layer among convolution layers of an encoder of the trained RC-Net is extracted and the features are derived by resizing the part-proposal into a size of a receptive field of the last convolution layer thereby destroying a spatial relationship between neighboring pixels that indicates product's part-level information, and the resized part-proposal is forward propagated through the convolution layers of the encoder in the trained RC-Net, and wherein the product image is untemplated during the part-proposal extraction in such a way that a dimension of the one or more part-proposals matches with that of a fixed-size receptive field;

clustering, via the one or more hardware processors, the generated one or more part-proposals of the product image into one or more clusters using a predefined K-means clustering model based on the predefined co-ordinates of the one or more key points;

extracting, via the one or more hardware processors, a feature vector from each of the one or more part-proposals of the product image using the trained RC-Net;

calculating, via the one or more hardware processors, a cosine similarity score between the extracted feature vector of one or more part-proposals in each of the one or more clusters using the trained RC-Net;

creating, via the one or more hardware processors, a symmetric matrix using the calculated cosine similarity score for each of the one or more clusters to determine a discriminative part-proposal from the one or more part-proposals in each of the one or more clusters;

sequencing, via the one or more hardware processors, the determined discriminative part-proposal in each of the one or more clusters based on the predefined co-ordinate, wherein in the sequencing of the determined discriminative part-proposal from the one or more part-proposals, the template image is also included as a last member of the sequence to relate parts with the template image;

estimating, via the one or more hardware processors, a part-level classification score of the sequenced discriminative part-proposal and the product image using the trained stacked conv-LSTM network;

combining, via the one or more hardware processors, the object-level and part-level classification score to get a final classification score of the product image, wherein the final classification score $l_F$, for the product image is obtained as:

$$l_F = l' + \gamma \hat{l}$$

where l is a label vector of the product image,
l' and $\hat{l}$ are predicted vectors,
$\gamma \in [0, 1]$ is a boost factor; and classifying, via the one or more hardware processors, a product image from the plurality of similar-looking products based on the final classification score.

2. The processor-implemented method of claim 1, wherein the training of RC-Net comprising steps of:

encoding, via the one or more hardware processors, the received at least one template image of each of the plurality of similar-looking products to identify one or more features of the plurality of similar-looking products;

decoding, via the one or more hardware processors, the identified one or more features of the plurality of similar-looking products to reconstruct the template image; and classifying, via the one or more hardware processors, the received at least one template image of each of the plurality of similar-looking products based on the identified one or more features of the plurality of similar-looking products.

3. The processor-implemented method of claim 1, wherein training of stacked conv-LSTM comprising steps of:

receiving, via the input/output interface, a plurality of template images of the plurality of similar-looking products;

identifying, via the one or more hardware processors, one or more key points on each of the plurality of template images using a predefined Binary Robust Invariant Scalable Keypoints (BRISK) model, wherein each of the one or more identified key points is represented by a predefined co-ordinate;

generating, via the one or more hardware processors, one or more part-proposals of each of the plurality of template images based on the identified one or more key points;

clustering, via the one or more hardware processors, the generated one or more part-proposals of each of the plurality of template images into one or more clusters using a predefined K-means clustering model based on the predefined co-ordinate of the one or more key points;

extracting, via the one or more hardware processors, a feature vector from each of the one or more part-proposals of each of the plurality of template images using the trained RC-Net;

calculating, via the one or more hardware processors, a cosine similarity score between the extracted feature vector of one or more part-proposals in each of the one or more clusters using the trained RC-Net;

creating, via the one or more hardware processors, a symmetric matrix using the calculated cosine similarity score for each of the one or more clusters to determine a discriminative part-proposal from the one or more part-proposals in each of the one or more clusters;

sequencing, via the one or more hardware processors, the determined discriminative part-proposal in each of the one or more clusters based on the predefined co-ordinate; and training, via the one or more hardware processors, a stacked convolutional LSTM network using the sequenced discriminative part-proposal and the template image.

4. The processor-implemented method of claim 1, wherein the trained RC-Net comprises of an encoder, a decoder, and a classifier.

5. The processor-implemented method of claim 1, wherein the trained RC-Net is a combination of convolutional autoencoder and a Convolutional Neural Network (CNN) classifier.

6. A system for fine-grained classification of a product image from images of a plurality of similar-looking products comprising:

an input/output interface to receive at least one template image of each of the plurality of similar-looking products and the product image from a user;

one or more hardware processors;

a memory in communication with the one or more hardware processors, wherein the one or more hardware processors are configured to execute programmed instructions stored in the memory, to:

pre-process the received at least one template image of each of the plurality of similar-looking products and the product image according to one or more pre-defined standards;

augment the pre-processed at least one template image of each of the plurality of similar-looking products based on a predefined photometric and geometric transformations;

train a reconstruction-classification network (RC-Net) and a stacked convolutional Long Short-Term Memory (conv-LSTM) network using the augmented at least one template image of each of the plurality of similar-looking products;

capture an object-level information of the product image using the trained RC-Net, wherein the object-level information represents an underlying pattern of the product image;

estimate an object-level classification score of the product image using the trained RC-Net based on the captured object-level information;

identify one or more key points on the product image using a predefined Binary Robust Invariant Scalable Keypoints (BRISK) model, wherein each of the one or more identified key points is represented by a predefined co-ordinate;

generate one or more part-proposals of the product image based on the identified one or more key points, wherein a feature for each of the part-proposal from a last convolution layer among convolution layers of an encoder of the trained RC-Net is extracted and the features are derived by resizing the part-proposal into a size of a receptive field of the last convolution layer thereby destroying a spatial relationship between neighboring pixels that indicates product's part-level information, and the resized part-proposal is forward propagated through the convolution layers of the encoder in the trained RC-Net, and wherein the product image is untemplated during the part-proposal extraction in such a way that a dimension of the one or more part-proposals matches with that of a fixed-size receptive field;

cluster the generated one or more part-proposals of the product image into one or more clusters using a predefined K-means clustering model based on the predefined co-ordinates of the one or more key points;

extract a feature vector from each of the one or more part-proposals of the product image using the trained RC-Net;

calculate a cosine similarity score between the extracted feature vector of one or more part-proposals in each of the one or more clusters using the trained RC-Net;

create a symmetric matrix using the calculated cosine similarity score for each of the one or more clusters to determine a discriminative part-proposal from the one or more part-proposals in each of the one or more clusters;

sequence the determined discriminative part-proposal in each of the one or more clusters based on the predefined co-ordinate, wherein in the sequencing of the determined discriminative part-proposal from the one or more part-proposals, the template image is also included as a last member of the sequence to relate parts with the template image;

estimate a part-level classification score of the sequenced discriminative part-proposal and the product image using the trained stacked conv-LSTM;

combine the object-level and part-level classification score to get a final classification score of the product image, wherein the final classification score $l_F$, for the product image is obtained as:

$$l_F = l' + \gamma \hat{l}$$

where l is a label vector of the product image,
l' and $\hat{l}$ are predicted vectors,
$\gamma \in [0, 1]$ is a boost factor; and classify a product image from the plurality of similar-looking products based on the final classification score.

7. The system of claim 6, wherein the training of RC-Net comprising:

encoding the received at least one template image of each of the plurality of similar-looking products to identify one or more features of the plurality of similar-looking products;

decoding the identified one or more features of the plurality of similar-looking products to reconstruct the template image; and classifying the received at least one template image of each of the plurality of similar-looking products based on the identified one or more features of the plurality of similar-looking products.

8. The system of claim 6, wherein training of stacked conv-LSTM comprising steps of:

receiving a plurality of template images of the plurality of similar-looking products;

identifying one or more key points on each of the plurality of template images using a predefined Binary Robust Invariant Scalable Keypoints (BRISK) model, wherein each of the one or more identified key points is represented by a predefined co-ordinate;

generating one or more part-proposals of each of the plurality of template images based on the identified one or more key points;

clustering the generated one or more part-proposals of each of the plurality of template images into one or more clusters using a predefined K-means clustering model based on the predefined co-ordinate of the one or more key points;

extracting a feature vector from each of the one or more part-proposals of each of the plurality of template images using the trained RC-Net;

calculating a cosine similarity score between the extracted feature vector of one or more part-proposals in each of the one or more clusters using the trained RC-Net;

creating a symmetric matrix using the calculated cosine similarity score for each of the one or more clusters to determine a discriminative part-proposal from the one or more part-proposals in each of the one or more clusters;

sequencing the determined discriminative part-proposal in each of the one or more clusters based on the predefined co-ordinate; and training a stacked convolutional LSTM network using the sequenced discriminative part-proposal and the template image.

9. A non-transitory computer readable medium storing one or more instructions which when executed by one or more processors on a system, cause the one or more processors to perform method comprising:

receiving, via an input/output interface, at least one template image of each of the plurality of similar-looking products and the product image from a user;

pre-processing, via a one or more hardware processors, the received at least one template image of each of the plurality of similar-looking products and the product image according to one or more predefined standards;

augmenting, via the one or more hardware processors, the pre-processed at least one template image of each of the plurality of similar-looking products based on a predefined photometric transformation and a geometric transformation;

training, via the one or more hardware processors, a reconstruction-classification network (RC-Net) and a stacked convolutional Long Short-Term Memory (conv-LSTM) network using the augmented at least one template image of each of the plurality of similar-looking products;

capturing, via the one or more hardware processors, an object-level information of the product image using the trained RC-Net, wherein the object-level information represents an underlying pattern of the product image;

estimating, via the one or more hardware processors, an object-level classification score of the product image using the trained RC-Net based on the captured object-level information;

identifying, via the one or more hardware processors, one or more key points on the product image using a predefined Binary Robust Invariant Scalable Keypoints (BRISK) model, wherein each of the one or more identified key points is represented by a predefined co-ordinate;

generating, via the one or more hardware processors, one or more part-proposals of the product image based on the identified one or more key points, wherein a feature for each of the part-proposal from a last convolution layer among convolution layers of an encoder of the trained RC-Net is extracted and the features are derived by resizing the part-proposal into a size of a receptive field of the last convolution layer thereby destroying a spatial relationship between neighboring pixels that indicates product's part-level information, and the resized part-proposal is forward propagated through the convolution layers of the encoder in the trained RC-Net, and wherein the product image is untemplated during the part-proposal extraction in such a way that a dimension of the one or more part-proposals matches with that of a fixed-size receptive field;

clustering, via the one or more hardware processors, the generated one or more part-proposals of the product image into one or more clusters using a predefined K-means clustering model based on the predefined co-ordinates of the one or more key points;

extracting, via the one or more hardware processors, a feature vector from each of the one or more part-proposals of the product image using the trained RC-Net;

calculating, via the one or more hardware processors, a cosine similarity score between the extracted feature vector of one or more part-proposals in each of the one or more clusters using the trained RC-Net;

creating, via the one or more hardware processors, a symmetric matrix using the calculated cosine similarity score for each of the one or more clusters to determine a discriminative part-proposal from the one or more part-proposals in each of the one or more clusters;

sequencing, via the one or more hardware processors, the determined discriminative part-proposal in each of the one or more clusters based on the predefined co-ordinate, wherein in the sequencing of the determined discriminative part-proposal from the one or more part-proposals, the template image is also included as a last member of the sequence to relate parts with the template image;

estimating, via the one or more hardware processors, a part-level classification score of the sequenced discriminative part-proposal and the product image using the trained stacked conv-LSTM network;

combining, via the one or more hardware processors, the object-level and part-level classification score to get a final classification score of the product image, wherein the final classification score $l_F$ for the product image is obtained as:

$$l_F = l' + \gamma \hat{l}$$

where l is a label vector of the product image,
l' and $\hat{l}$ are predicted vectors,
$\gamma \in [0, 1]$ is a boost factor; and classifying, via the one or more hardware processors, a product image from the plurality of similar-looking products based on the final classification score.

10. The non-transitory computer readable medium of claim 9, wherein the training of RC-Net comprising steps of:

encoding, via the one or more hardware processors, the received at least one template image of each of the plurality of similar-looking products to identify one or more features of the plurality of similar-looking products;

decoding, via the one or more hardware processors, the identified one or more features of the plurality of similar-looking products to reconstruct the template image; and classifying, via the one or more hardware processors, the received at least one template image of each of the plurality of similar-looking products based on the identified one or more features of the plurality of similar-looking products.

11. The non-transitory computer readable medium of claim 9, wherein training of stacked conv-LSTM comprising steps of:

receiving, via the input/output interface, a plurality of template images of the plurality of similar-looking products;

identifying, via the one or more hardware processors, one or more key points on each of the plurality of template images using a predefined Binary Robust Invariant Scalable Keypoints (BRISK) model, wherein each of the one or more identified key points is represented by a predefined co-ordinate;

generating, via the one or more hardware processors, one or more part-proposals of each of the plurality of template images based on the identified one or more key points;

clustering, via the one or more hardware processors, the generated one or more part-proposals of each of the plurality of template images into one or more clusters using a predefined K-means clustering model based on the predefined co-ordinate of the one or more key points;

extracting, via the one or more hardware processors, a feature vector from each of the one or more part-proposals of each of the plurality of template images using the trained RC-Net;

calculating, via the one or more hardware processors, a cosine similarity score between the extracted feature vector of one or more part-proposals in each of the one or more clusters using the trained RC-Net;

creating, via the one or more hardware processors, a symmetric matrix using the calculated cosine similarity score for each of the one or more clusters to determine a discriminative part-proposal from the one or more part-proposals in each of the one or more clusters;

sequencing, via the one or more hardware processors, the determined discriminative part-proposal in each of the one or more clusters based on the predefined co-ordinate; and training, via the one or more hardware processors, a stacked convolutional LSTM network using the sequenced discriminative part-proposal and the template image.

* * * * *